United States Patent
Watanabe et al.

(10) Patent No.: US 9,790,098 B2
(45) Date of Patent: Oct. 17, 2017

(54) SINTERED ELECTRICALLY CONDUCTIVE OXIDE, THERMISTOR ELEMENT EMPLOYING THE OXIDE, AND TEMPERATURE SENSOR EMPLOYING THE THERMISTOR

(71) Applicant: NGK SPARK PLUG CO., LTD., Nagoya-shi, Aichi (JP)

(72) Inventors: Hiroshi Watanabe, Nagoya (JP); Shinji Ban, Aichi (JP); Tomoki Yamaguchi, Anjo (JP); Yasuyuki Okimura, Inuyama (JP); Tomohiro Nishi, Aichi (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 17 days.

(21) Appl. No.: 15/090,783

(22) Filed: Apr. 5, 2016

(65) Prior Publication Data

US 2016/0289083 A1    Oct. 6, 2016

(30) Foreign Application Priority Data

Apr. 6, 2015 (JP) ................................. 2015-077398
Oct. 15, 2015 (JP) ................................. 2015-204134

(51) Int. Cl.
*H01B 1/08* (2006.01)
*H01C 7/00* (2006.01)
(Continued)

(52) U.S. Cl.
CPC ............ *C01G 37/006* (2013.01); *C04B 35/12* (2013.01); *G01K 7/22* (2013.01); *G05D 23/24* (2013.01);
(Continued)

(58) Field of Classification Search
CPC .... H01B 1/00; H01B 1/08; H01L 7/00; H01L 7/008; H01L 7/10; H01L 7/108
See application file for complete search history.

(56) References Cited

U.S. PATENT DOCUMENTS

| 7,656,269 B2 * | 2/2010 | Mizoguchi ........... C01G 45/125 252/500 |
| 2011/0220854 A1 | 9/2011 | Okimura et al. |
| 2012/0049996 A1 | 3/2012 | Kobayashi et al. |

FOREIGN PATENT DOCUMENTS

| EP | 1137016 A1 | 9/2001 |
| EP | 2421007 A2 | 2/2012 |

(Continued)

OTHER PUBLICATIONS

Communication dated Sep. 7, 2016 issued by the European Patent Office in counterpart European Patent Application No. 16164075.0.

*Primary Examiner* — Mark Kopec
(74) *Attorney, Agent, or Firm* — Sughrue Mion, PLLC

(57) ABSTRACT

A sintered electroconductive oxide having a perovskite oxide type crystal structure represented by a compositional formula: $M1_aM2_bMn_cAl_dCr_eO_f$ wherein M1 represents at least one element selected from group 3 elements; and M2 represents at least one element selected from among Mg, Ca, Sr and Ba, wherein element M1 predominantly includes at least one element selected from Nd, Pr and Sm, and a, b, c, d, e and f satisfy the following relationships: $0.6005 \leq a < 1.000$, $0 < b \leq 0.400$, $0 \leq c < 0.150$, $0.400 \leq d < 0.950$, $0.050 < e \leq 0.600$, $0.50 < e/(c+e) \leq 1.00$, and $2.80 \leq f \leq 3.30$. Also disclosed is a thermistor element including a thermistor portion which is formed of the sintered electroconductive oxide as well as a temperature sensor employing the thermistor element.

6 Claims, 4 Drawing Sheets

(51) Int. Cl.
    *C01G 37/00*    (2006.01)
    *G01K 7/22*     (2006.01)
    *C04B 35/12*    (2006.01)
    *G05D 23/24*    (2006.01)

(52) U.S. Cl.
    CPC .............. *H01B 1/08* (2013.01); *H01C 7/008* (2013.01); *C01P 2006/40* (2013.01); *C04B 2235/3205* (2013.01); *C04B 2235/3206* (2013.01); *C04B 2235/3208* (2013.01); *C04B 2235/3213* (2013.01); *C04B 2235/3215* (2013.01); *C04B 2235/3217* (2013.01); *C04B 2235/3224* (2013.01); *C04B 2235/3225* (2013.01); *C04B 2235/3241* (2013.01); *C04B 2235/3262* (2013.01); *C04B 2235/5436* (2013.01); *C04B 2235/602* (2013.01); *C04B 2235/604* (2013.01); *C04B 2235/768* (2013.01)

(56) References Cited

FOREIGN PATENT DOCUMENTS

| | | | |
|---|---|---|---|
| EP | 2426471 | A1 | 3/2012 |
| EP | 3079032 | A1 * | 10/2016 |
| GB | 2479293 | A | 10/2011 |
| JP | 2003-183075 | A | 7/2003 |
| JP | 2004-221519 | A | 8/2004 |
| JP | 2007-246381 | A | 9/2007 |
| JP | 5053563 | B2 | 10/2012 |
| JP | 2013-199396 | A | 10/2013 |
| JP | 2013-234105 | A | 11/2013 |

\* cited by examiner

| SAMPLE NO. | M1 (GROUP 3 ELEMENT) | | | | | M2 (ALKALINE EARTH) | | | | Mn | Al | Cr | Cr CONTENT RATIO | B CONST (-40~900) | TEMP. CHANGE AFTER HIGH-TEMP. DURABILITY TEST CT(900) [deg] |
|---|---|---|---|---|---|---|---|---|---|---|---|---|---|---|---|
| | Y | Pr | Nd | Sm | Yb | Mg | Ca | Sr | Ba | c | d | e | $e/(c+e)$ | $B(-40\sim900)$ [K] | |
| | | | a | | | | b | | | | | | | | |
| S1 | 0.150 | — | 0.750 | — | — | — | 0.100 | — | — | — | 0.850 | 0.150 | 1.000 | 2797 | 1.3 |
| S2 | — | — | 0.600 | — | — | — | 0.400 | — | — | — | 0.600 | 0.400 | 1.000 | 2956 | 1.8 |
| S3 | — | — | 0.800 | — | — | — | 0.200 | — | — | — | 0.700 | 0.300 | 1.000 | 2899 | 1.1 |
| S4 | — | — | 0.900 | — | — | — | 0.100 | — | — | — | 0.850 | 0.150 | 1.000 | 2664 | 0.8 |
| S5 | — | — | 0.930 | — | — | — | 0.070 | — | — | — | 0.850 | 0.150 | 1.000 | 2543 | 0.5 |
| S6 | — | — | 0.950 | — | — | — | 0.050 | — | — | — | 0.850 | 0.150 | 1.000 | 2458 | 0.2 |
| S7 | — | — | 0.970 | — | — | — | 0.030 | — | — | — | 0.850 | 0.150 | 1.000 | 2430 | 0.3 |
| S8 | — | — | 0.990 | — | — | — | 0.010 | — | — | — | 0.850 | 0.150 | 1.000 | 2602 | 0.7 |
| S9 | — | — | 0.750 | — | 0.150 | — | 0.100 | — | — | — | 0.850 | 0.150 | 1.000 | 2531 | 1.6 |
| S10 | — | — | 0.950 | — | — | 0.010 | 0.040 | — | — | — | 0.850 | 0.150 | 1.000 | 2950 | 1.2 |
| S11 | — | — | 0.950 | — | — | — | 0.040 | 0.010 | — | — | 0.850 | 0.150 | 1.000 | 2448 | 0.4 |
| S12 | — | — | 0.950 | — | — | — | — | 0.050 | — | — | 0.850 | 0.150 | 1.000 | 2407 | 1.3 |
| S13 | — | — | 0.950 | — | — | — | 0.040 | — | 0.010 | — | 0.850 | 0.150 | 1.000 | 2888 | 1.1 |
| S14 | — | — | 0.950 | — | — | — | 0.050 | — | — | 0.050 | 0.750 | 0.150 | 1.000 | 2534 | 0.6 |
| S15 | — | — | 0.900 | — | — | — | 0.100 | — | — | 0.100 | 0.600 | 0.300 | 0.800 | 2801 | 1.2 |
| S16 | — | — | 0.900 | — | — | — | 0.100 | — | — | 0.140 | 0.600 | 0.260 | 0.750 | 2890 | 1.7 |
| S17 | — | — | 0.950 | — | — | — | 0.050 | — | — | — | 0.900 | 0.100 | 0.650 | 2913 | 1.4 |
| S18 | — | — | 0.800 | — | — | — | 0.200 | — | — | — | 0.400 | 0.600 | 1.000 | 2252 | 1.8 |
| S19 | — | 0.930 | — | — | — | — | 0.070 | — | — | — | 0.850 | 0.150 | 1.000 | 2434 | 0.7 |
| S20 | — | — | — | 0.930 | — | — | 0.070 | — | — | — | 0.850 | 0.150 | 1.000 | 2579 | 1.1 |
| S21 | — | 0.465 | 0.465 | — | — | — | 0.070 | — | — | — | 0.850 | 0.150 | 1.000 | 2489 | 0.6 |
| S22* | — | — | 0.550 | — | — | — | 0.450 | — | — | — | 0.750 | 0.250 | 1.000 | 2633 | 4.2 |
| S23* | — | — | 0.900 | — | — | — | 0.100 | — | — | 0.200 | 0.500 | 0.300 | 0.600 | 2987 | 3.4 |
| S24* | — | — | 0.900 | — | — | — | 0.100 | — | — | 0.100 | 0.810 | 0.090 | 0.474 | 4689 | 1.3 |
| S25* | — | — | 0.800 | — | — | — | 0.200 | — | — | — | 0.300 | 0.700 | 1.000 | 1758 | 5.8 |
| S26* | — | — | — | 0.860 | — | — | 0.140 | — | — | 0.175 | 0.300 | 0.525 | 0.750 | 1902 | 8.7 |

COMPOSITION: $ABO_3 = (M1_a M2_b)(Mn_c Al_d Cr_e)O_f$

FIG. 4

SINTERED ELECTRICALLY CONDUCTIVE OXIDE, THERMISTOR ELEMENT EMPLOYING THE OXIDE, AND TEMPERATURE SENSOR EMPLOYING THE THERMISTOR

BACKGROUND OF THE INVENTION

1. Field of the Invention

The present invention relates to a sintered electrically conductive oxide, to a thermistor element employing the oxide, and to an apparatus employing the thermistor element such as a temperature sensor.

2. Background Art

Conventionally known thermistor elements include those which employ a sintered electroconductive oxide whose electric resistance varies with temperature. One use of such a thermistor element is to measure the temperature of exhaust gas discharged from an internal combustion engine such as an automobile engine. In such a use, as a result of recent enhancements in the precision of exhaust gas purification systems, there has been an increased demand for thermistor elements having good heat resistance in a high-temperature region near 900° C. Meanwhile, in order to detect a failure (wire breakage) of a temperature sensor in an on-board diagnostic system (i.e., an OBD system) or the like, there is a need to detect the temperature of an engine even when its temperature is low, for example, when the engine is started or when an engine key is in its ON state. Since the temperature at the start of the engine may be below zero particularly in a cold district, there is a demand for a thermistor element which can carry out temperature measurement even at −40° C.

Patent Document 1 discloses a thermistor element which employs a sintered electroconductive oxide having a perovskite type crystal structure represented by the compositional formula: $M1_aM2_bM3_cAl_dCr_eO_f$ (wherein M1 represents at least one of Y, Nd and Yb; M2 represents at least one of Mg, Ca and Sr: and M3 represents at least one of Mn and Fe). In this thermistor element, the sintered electroconductive oxide exhibits stable thermistor performance over a wide temperature range from −40° C. to 900° C., whereby the temperature within the temperature range can be appropriately measured.

Patent Document 1: Japanese Patent No. 5053563

3. Problems to be Solved by the Invention

The present inventors found that the sintered electroconductive oxide disclosed in Patent Document 1 has a problem requiring improvement. Specifically, in conventional sintered electroconductive oxides having a perovskite type crystal structure, the B site element(s) determine the electrical conductivity of the oxides. In the perovskite type crystal structure disclosed in Patent Document 1, the B site atom includes (Mn, Fe) as M3, Al, and Cr. Among these elements, Al has a consistent valence of +3. Thus, the conductivity is mainly determined by (Mn, Fe) as M3 or Cr. Furthermore, in Patent Document 1, the factor (atom fraction) c of element M3 is 0.150 to 0.600, and that of factor e of Cr is 0.005 to 0.050. This indicates that (Mn and Fe) as M3 mainly determine electrical conductivity. However, Mn and Fe are elements which readily undergo valance change. Thus, when the oxide is subjected to a temperature of higher than 900° C., the temperature characteristics of the sintered electroconductive oxide vary. Consequently the oxide may fail to meet the aforementioned recent requirement of high heat resistance.

SUMMARY OF THE INVENTION

The present invention has been achieved in order to solve the aforementioned problem. It is therefore an object of the invention to provide a sintered electroconductive oxide having high heat resistance, as well as a thermistor element comprising a thermistor portion formed of the sintered electroconductive oxide and a temperature sensor comprising the thermistor element.

The above object has been achieved by providing (1) a sintered electroconductive oxide having a perovskite oxide type crystal structure. The sintered electroconductive oxide has a perovskite oxide type crystal structure represented by a compositional formula: $M1_aM2_bMn_cAl_dCr_eO_f$ wherein M1 represents at least one element selected from group 3 elements; and M2 represents at least one element selected from the group consisting of Mg, Ca, Sr and Ba. The element M1 predominantly includes at least one element selected from the group consisting of Nd, Pr and Sm, and the aforementioned a, b, c, d, e and f satisfy the following relationships:

$0.600 \leq a < 1.000$, $0 < b \leq 0.400$, $0 \leq c < 0.150$, $0.400 \leq d < 0.950$, $0.050 < e > 0.600$, $0.50 < e/(c+e) \leq 1.00$, and $2.80 \leq f \leq 3.30$.

In the sintered electroconductive oxide, the B site element of the perovskite type crystal structure includes Mn Al and Cr, and the ratio of Cr content to the total amount of Mn and Cr (excluding Al), e/(c+e), falls within a range of greater 0.50 to 1.00. Thus, Cr mainly determines conductivity. Since Cr is stable in valence as compared with Mn and Fe, the presence of Cr can minimize the change in electrical properties due to thermal history. Thus, the present invention can provide a sintered electroconductive oxide having a heat resistance higher than that conventionally attained. Also, when the element M1 mainly includes at least one element selected from among Nd, Pr and Sm, the heat resistance of the sintered electroconductive oxide can be enhanced.

In a preferred embodiment (2) of the aforementioned sintered electroconductive oxide (1), c and e satisfy $0.65 \leq e/(c+e) \leq 1.00$.

According to this feature, a sintered electroconductive oxide having a higher heat resistance can be obtained.

In another preferred embodiment (3) of the sintered electroconductive oxide (1) or (2) above, a, b, c, d, e and f satisfy the following relationships:

$0.700 \leq a < 1.000$, $0 < b \leq 0.300$ $0 \leq c < 0.140$, $0.500 < d < 0.950$, $0.050 < e \leq 0.500$, $0.65 < e/(c+e) \leq 1.00$, and $2.80 \leq f \leq 3.30$.

According to this feature, a sintered electroconductive oxide having higher heat resistance can be obtained.

In yet another preferred embodiment (4) of the sintered electroconductive oxide of any of (1) to (3) above, the element M1 is at least one element selected from the group consisting of Nd, Pr and Sm, and the element M2 is at least one element selected from the group consisting of Ca and Sr.

According to this feature, a sintered electroconductive oxide having higher heat resistance can be obtained.

The present invention can be embodied in various apparatuses such as a thermistor element comprising the sintered electroconductive oxide. Another mode is a temperature sensor comprising the thermistor element. Other modes embodying the invention include a method for producing the sintered electroconductive oxide or the thermistor element.

BRIEF DESCRIPTION OF THE DRAWINGS

FIG. 4 is a graph showing compositions and characteristics of samples.

DESCRIPTION OF THE REFERENCE NUMERALS

Figure 1:
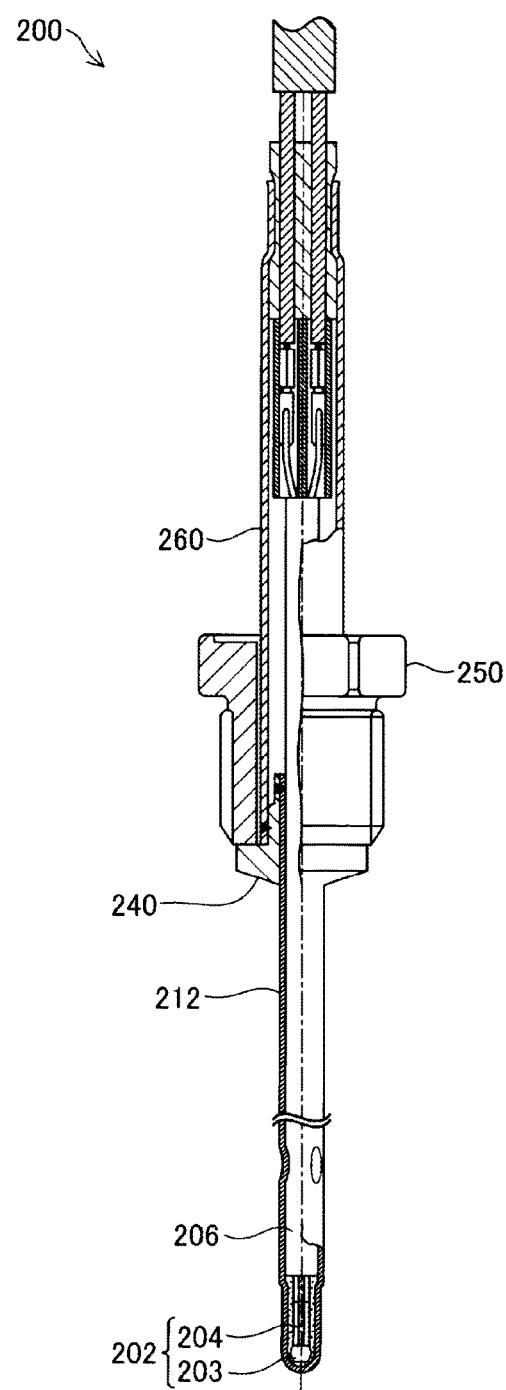
FIG. 1 is a partial sectional view of a temperature sensor serving as an embodiment of the present invention.

Reference numerals used to identify various features in the drawings include the following.
200: temperature sensor;
202: thermistor element;
203: thermistor portion,
204: element electrode wire,
206: sheath member;
212: metallic tube;
240: mounting member;
250: nut member; and
260: tubular member

DETAILED DESCRIPTION OF THE PREFERRED EMBODIMENTS

The invention will now be described in further detail with reference to the drawings. However, the present invention should not be construed as being limited thereto.

FIG. 1 is a partial cut away sectional view showing an example of a temperature sensor 200 according to one embodiment of the present invention. The temperature sensor 200 of the present embodiment includes a thermistor element 202 serving as a temperature sensing element; a sheath member 206 which holds the thermistor element 202, the thermistor element 202 being attached to a forward end of the sheath member 206; a metallic tube 212 which accommodates the sheath member 206 and the thermistor element 202; a mounting member 240 welded to one end of the metallic tube 212; a tubular member 260, one end of which is welded to the mounting member 240; and a nut member 250 which is rotatably fitted onto the tubular member 260. Notably, ceramic cement (not shown) for preventing the thermistor element 202 and the sheath member 206 from swaying is charged inside the metallic tube 212. This temperature sensor 200 is used, for example, in a state in which it is attached to an exhaust pipe of an internal combustion engine. The thermistor element 202 provided at the forward end of the temperature sensor 200 is disposed inside the exhaust pipe through which exhaust gas flows, and detects the temperature of the exhaust gas.

Figure 2:
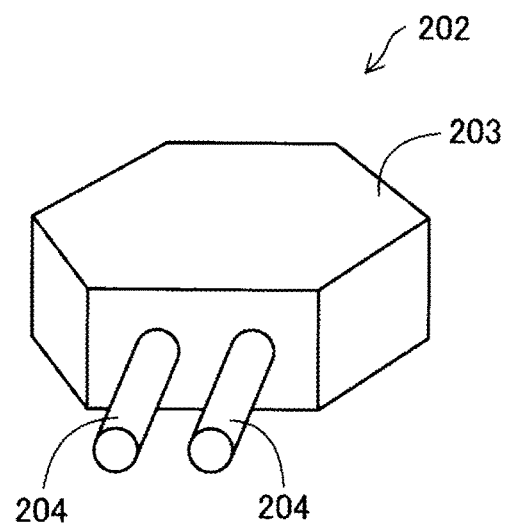
FIG. 2 is a perspective view of a thermistor element serving as another embodiment of the present invention.

FIG. 2 is a perspective view of the thermistor element 202. The thermistor element 202 includes a plate-shaped thermistor portion 203 having a hexagonal planar shape, and two element electrode wires 204. The thermistor portion 203 is formed of a sintered electroconductive oxide having a perovskite type crystal structure. A preferred composition of this sintered electroconductive oxide will be described in detail below.

<Preferred Composition of Sintered Electroconductive Oxide>

The sintered electroconductive oxide having a perovskite type crystal structure is preferably represented by the following compositional formula (1):

$$(M1_aM2_b)(Mn_cAl_dCr_e)O_f \qquad (1),$$

wherein M1 represents at least one element selected from group 3 elements; M2 represents at least one element selected from among Mg, Ca, Sr and Ba; and a to f are compositional factors.

As used herein, the term "group 3 element" refers to a group of elements consisting of scandium ($_{21}$Sc), yttrium ($_{39}$Y), lanthanides ($_{57}$La to $_{71}$Lu) and actinides ($_{89}$Ac to $_{103}$Lr).

Generally, the perovskite type crystal structure is represented by a compositional formula $ABO_3$. In the formula (1) above, elements M1 and M2 are A-site elements, and other elements—Mn, Al and Cr—are B-site elements. In the case where a crystal species represented by formula (1) above has a typical perovskite type crystal structure, the relationships: a+b=1 and c+d+e=1 are preferably established. The factor f is preferably 3±x (x is about 0.3). Note that the above relationships may vary slightly, so long as the temperature characteristics of the oxide are not affected.

The element M1 which may be used in the invention is at least one element selected from group 3 elements. Preferably, the element M1 predominantly includes at least one element selected from Nd, Pr and Sm. In other words, among elements M1, at least one element selected from Nd, Pr and Sm is preferably included at a molar fraction of 50% or higher. When the element M1 employed in the invention predominantly includes at least one element selected from Nd, Pr and Sm, consistent target characteristics can be realized in a wide temperature range, and the heat resistance can be enhanced. Conceivably, the reason why such a consistent characteristic can be attained by elements M1 predominantly including at least one element selected from Nd, Pr and Sm is that Nd, Pd and Sm, among group 3 elements, have relatively large ionic radii. Thus, there is a small difference in ionic radius between the group 3 elements and the element M2 (in particular, Ca or Sr), whereby the perovskite type crystal structure is stabilized.

The factors a to f of the formula (1) above preferably satisfy the following relationships:

$$0.600 \le a < 1.000 \qquad (2a),$$

$$0 < b \le 0.400 \qquad (2b),$$

$$0 \le c < 0.150 \qquad (2c),$$

$$0.400 \le d < 0.950 \qquad (2d),$$

$$0.050 < e \le 0.600 \qquad (2e),$$

$$0.50 < e/(c+e) \leq 1.00 \quad (2f), \text{ and}$$

$$2.80 \leq f \leq 3.30 \quad (2g).$$

The sintered electroconductive oxide represented by formula (1) and satisfying the relationships (2a) to (2g) contains, as B-site elements of the perovskite type crystal structure, Mn, Al and Cr. The ratio of Cr content to the total amount of Mn and Cr—$e/(c+e)$—falls within a range of greater than 0.50 to 1.00 (excluding 0.50). Thus, in the sintered electroconductive oxide, not Mn but Cr mainly determines conductivity. Since Cr is stable in valence as compared with Mn and Fe, the presence of Cr can minimize the change in electrical property due to thermal history. Thus, the present invention can provide a sintered electroconductive oxide having a heat resistance higher than that conventionally attained. Hereinafter, the ratio "$e/(c+e)$" is also referred to also as "Cr content ratio $e/(c+e)$."

From the viewpoint of heat resistance, the oxide more preferably satisfies $0.65 \leq e/(c+e) \leq 1.00$ instead of formula (2f) above. In this case, the Cr content further increases, whereby heat resistance can be further enhanced.

Instead of (2a) to (2g), the factors a to f of the formula (1) above more preferably satisfy the following relationships:

$$0.700 \leq a < 1.000 \quad (3a),$$

$$0 < b \leq 0.300 \quad (3b),$$

$$0 \leq c < 0.140 \quad (3c),$$

$$0.500 < d < 0.950 \quad (3d),$$

$$0.050 < e \leq 0.500 \quad (3e),$$

$$0.65 < e/(c+e) \leq 1.00 \quad (3f), \text{ and}$$

$$2.80 \leq f \leq 3.30 \quad (3g).$$

Under the above compositional conditions, a sintered electroconductive oxide having a higher heat resistance can be obtained. This will be described hereinafter with reference to the following examples and experimental results.

Figure 3:
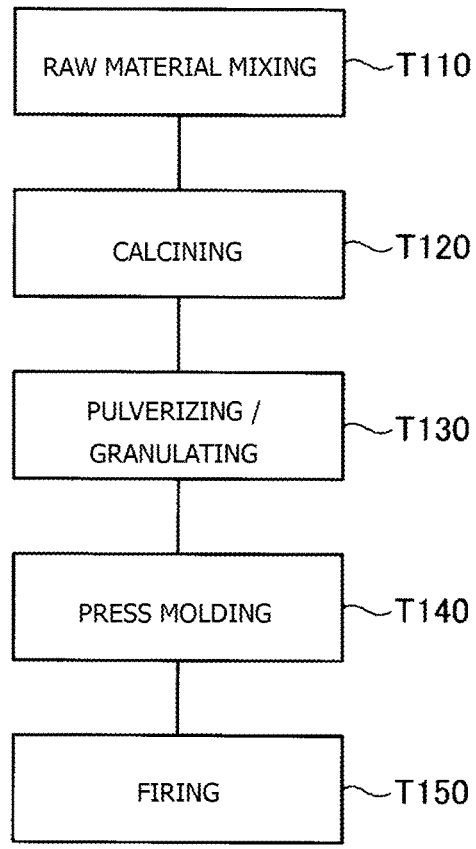
FIG. 3 is a flow chart showing a method for producing a thermistor element.

FIG. 3 is a flow chart showing a method for producing a thermistor element serving as an embodiment of the present invention. In step T110, a raw material powder mixture of a sintered electroconductive oxide having a perovskite type crystal structure is prepared by selecting required members from an element M1-containing material powder (e.g., $Y_2O_3$, $Nd(OH)_3$, $Pr_6O_{11}$, $Sm_2O_3$ or $Yb_2O_3$), an element M2-containing material powder (i.e., $MgCO_3$, $CaCO_3$, $SrCO_3$ or $BaCO_3$), and an additional element (Mn, Al or Cr)-containing material powder (e.g., $MnO_2$, $Al_2O_3$ or $Cr_2O_3$) (all being commercially available products having a purity of $\geq 99\%$), wet-mixing them at correct proportional weights, and drying the mixture. In step T120, the raw material powder mixture is calcined at 1,400° C. for 2 hours in air, to thereby obtain a calcined powder. In step 1130, the calcined powder is pulverized and granulated. In a specific procedure, the powder is placed into a resin pot and is subjected to wet mixing/pulverization with high-purity alumina balls in ethanol as a dispersion medium. Subsequently, the thus-obtained slurry is dried by means of a hot water bath, to thereby yield a synthesized powder. To this synthesized powder (100 parts by weight), a binder (20 parts by weight) mainly containing polyvinyl butyral is added, and the resultant mixture is uniformly mixed and dried. Then, the dry product is granulated through a sieve (opening: 250 μm), to thereby form a granulated powder. No particular limitation is imposed on the binder which may be used in the procedure, and other than the aforementioned polyvinyl butyral, other binders such as polyvinyl alcohol and an acrylic binder may also be used. The amount of the binder is generally 5 to 20 parts by weight, with respect to 100 parts by weight of the synthesized powder, preferably 10 to 20 parts by weight. Upon mixing with the binder, the mean particle size of the synthesized powder is preferably adjusted to 2.0 μm or less, to thereby attain uniform mixing. Notably, the mean particle size of the synthesized powder is a sphere-equivalent diameter as determined by laser diffraction/scattering.

In step T140, the powder granulated in step T130 is press-molded through a metal molding technique (pressing pressure: 4,500 kg/cm$^3$). As shown in FIG. 2, a hexagonal plate with one end where a pair of Pt—Rh alloy element electrode wires 204 are disposed inside is formed through the molding technique. In step T150, the molded product is fired in air at 1,500° C. to 1,600° C. for 2 to 4 hours, to thereby produce a thermistor element 202.

Figure 5:
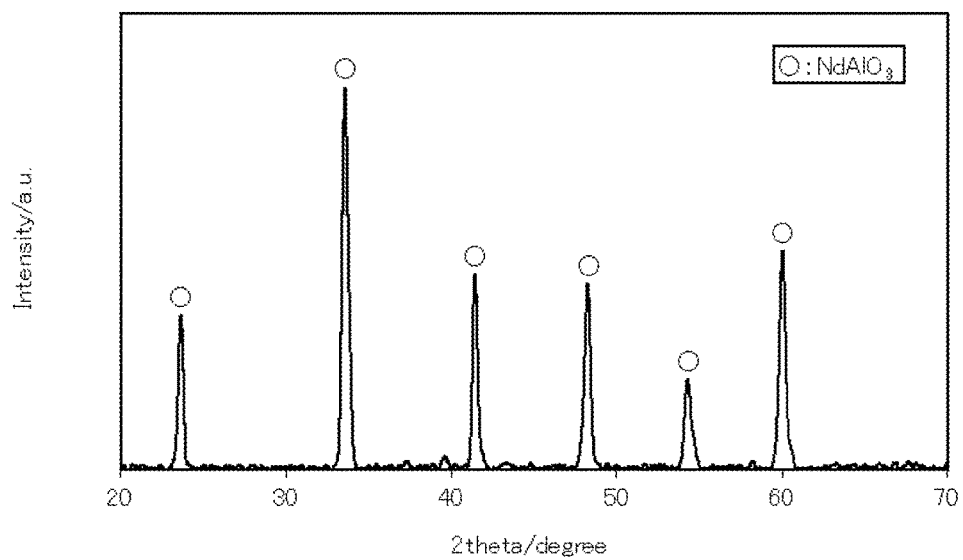
FIG. 5 is an X-ray diffraction chart of a sintered electroconductive oxide sample S6.

FIG. 4 is a table showing compositions and characteristics of a plurality of sintered electroconductive oxide samples for producing thermistor elements. In FIG. 4, samples S1 to S21 fall within the scope of the Examples of the invention, and samples S22 to S26 denoted with a mark "*" correspond to comparative samples. These samples S1 to S26 were produced through the steps of FIG. 3. The factors a to e in relation to elemental compositional proportions shown in FIG. 4 correspond to the compositional proportions in mixing of raw materials in step T110 (FIG. 3). Notably, although no data of factor f is given in FIG. 4, the factor f was found to be $2.80 \leq f \leq 3.30$ based on elemental compositional proportions determined by X-ray fluorescent spectrometry. Also, FIG. 5 is an X-ray diffraction chart of sintered electroconductive oxide sample S6.

In FIG. 4, experimentally obtained characteristics of each sample are shown in two columns on the right side of the table. Specifically, B constant (B)(−40 to 900) and a change in electrical resistance at a measured temperature after conducting a high-temperature durability test as a reduced value CT(900) are given.

The B constant (i.e., a temperature gradient factor) was determined by the following procedure. Firstly, a thermistor element 202 employing each sample was held at a temperature of −40° C. (absolute temperature T(−40)=233 K), and the initial resistance Rs(−40) between the element electrode wires 204 was measured. Then, the thermistor element 202 was held at 900° C. (absolute temperature T(900)=1,173 K), and the initial resistance Rs(900) between the element electrode wires 204 was measured.

The B constant (B)(−40 to 900) was calculated using the following formula:

$$B(-40 \text{ to } 900) = \ln[Rs(900)/Rs(-40)]/[1/T(900) - 1/T(-40)] \quad (4).$$

The change in electrical resistance at a measured temperature after conducting the high-temperature durability test—a reduced value CT(900)—was determined through the following procedure. Firstly, each sample before the high-temperature durability test was held at 900° C., and the initial resistance Rs(900) was measured. Subsequently, the sample was maintained in air at 1,050° C. for 50 hours, to thereby conduct a high-temperature durability test. Then, in the same manner as described above, the resistance Ra(900) after the high-temperature durability test was measured. From the initial resistance Rs before the high-temperature durability test and the resistance Ra after the high-temperature durability test, the change in electrical resistance at a measured temperature after conducting the high-temperature durability test—namely, a reduced value CT(900)—was calculated by the following formula:

$$CT(900)=[(B(-40 \text{ to } 900) \times T(100))/[\ln(Ra(900)/Rs(900)) \times T(900) + B(-40 \text{ to } 900)]] - T(900) \quad (5).$$

Hereinafter, the reduced value CT(900) is also referred to also as "temperature change reduced value CT(900)."

As shown in FIG. 4, samples S1 to S21 were found to have a B constant of 2,000 K to 3,000 K, which is a preferred range. The thermistor element 202 employing such a sintered electroconductive oxide exhibits an appropriate electrical resistance within a wide temperature range of −40° C. to 900° C., to thereby attain appropriate temperature measurement. In addition, all samples S1 to S21 exhibited an absolute value of the temperature change reduced value CT(900) of 3.0 deg or lower, which is considerably low and advantageous. As a result, the thermistor element 202 employing any of samples S1 to S21 was found to realize consistent temperature measurement for a long period of time within a wide temperature range toward a high temperature region higher than 900° C.

Comparative samples S22 to S26 exhibited an absolute value of the temperature change reduced value CT(900) greater than 3.0 deg or a B constant falling outside the range of 2,000 K to 3,000 K. From this viewpoint, samples S1 to S21 of the Examples are preferred. More specifically, sample S22, which had factors a and b falling outside the aforementioned ranges (2a) and (2b), and sample S23, which has a factor c falling outside the aforementioned range (2c), exhibited an absolute value of the temperature change reduced value CT(900) greater than 3.0 deg. In such a case, when the thermistor element 202 is exposed to a high temperature of 900° C. or higher, for a long period of time, the change in electrical resistance increases, whereby the heat resistance of a temperature sensor which has improved in recent years may fail to be attained. Sample S24, which has a Cr content ratio e/(c+e) falling outside the aforementioned range (2f) exhibited a B constant higher than 3,000 K. In this case, the thermistor element 202 exhibits an excessively large change in terms of resistance within a temperature range of −40° C. to 900° C. Thus, the appropriate resistance measurement fails to be performed in the temperature range, thereby encountering difficulty in appropriately measuring temperature. Sample S25, which had factors d and e falling outside the aforementioned ranges (2d) and (2e), and sample S26, which had factors c and d falling outside the aforementioned ranges (2c) and (2d), exhibited a B constant lower than 2,000 K. In this case, a resistance measurement can be performed within a temperature range of −40° C. to 900° C. However, since the change in electrical resistance of the thermistor element 202 is excessively reduced, precision in resistance measurement is impaired, thereby encountering difficulty in appropriately measuring temperature. Samples S25 and S26, which exhibited an absolute value of the temperature change reduced value CT(900) further greater than 3.0 deg, may fail to meet the requirement of high heat resistance.

Among samples S1 to S21 of the Examples, samples S2, S16 and S18 exhibited an absolute value of the temperature change reduced value CT(900) of 1.7 deg or higher, which is slightly higher than that of each of samples S1, S3 to S15, S17, and S19 to S21. Samples S2. S16, and S18 each have factors not satisfying the aforementioned (3a) to (3g), but samples S1, S3 to S15, S17, and S19 to S21 each have factors satisfying the aforementioned (3a) to (3g). Thus, when the compositional factors satisfy the aforementioned (3a) to (3g), a sintered electroconductive oxide having higher heat resistance, and a thermistor element employing the oxide, can be obtained.

Notably, samples S1 and S9 differ from sample S4 in that the former contains, in addition to Nd, Y or Yb as elements M1, and the latter contains Nd as a sole element M1. Except this feature, the former and the latter have the same composition. Sample S4 exhibited an absolute value of the temperature change reduced value CT(900) of 0.8, while samples S1 and S9 exhibited absolute values of CT(900) of 1.3 and 1.6, respectively, which are slightly greater. Thus, from the viewpoint of heat resistance, element M1 preferably consists of Nd. As described above, conceivably, the reason for enhanced heat resistance in the case where Nd is employed as element M1 is that there is a small difference in ionic radius between Nd and element M2, and thus the perovskite type crystal structure is stabilized. Samples S5, S19 and S20 contain, as a solo element M1, Nd, Pr and Sm, respectively. Except for this feature, the samples have the same composition. Samples S5 and S19 exhibited absolute values of the temperature change reduced value CT(900) of 0.5 and 0.7, respectively, while sample S20 exhibited an absolute value of CT(900) of 1.1, which is slightly greater. Thus, from the viewpoint of heat resistance, element M1 more preferably consists of at least one element selected from Pr and Nd. In consideration of minimizing variation in temperature characteristics during mass-production of sintered electroconductive oxides (thermistor elements), element M1 preferably includes Nd as a predominant element. Conceivably, the reason why heat resistance is impaired when Sm is employed as element M1 is that Sm, among Pr, Nd and Sm, has the smallest ionic radius, which impairs stability of the perovskite type crystal structure.

Also, samples S10 and S13 differ from sample S6 in that the former contains, in addition to Ca, Mg or Ba as elements M2, and the latter contains Ca as a sole element M2. Except for this feature, the former and the latter have the same composition. Sample S6 exhibited an absolute value of the temperature change reduced value CT(900) of 0.2, while samples S10 and S13 exhibited absolute values of CT(900) of 1.2 and 1.1, respectively, which are slightly greater. Thus, from the viewpoint of heat resistance, element M2 preferably consists of Ca. Notably, sample S11, which contains Ca and Sr as elements M2, exhibited an absolute value of the temperature change reduced value CT(900) as small as 0.4. Thus, element M2 preferably consists of at least one element selected from Ca and Sr, and more preferably contains Ca as a predominant element. Most preferably, element M2 consists of Ca as a sole element. Conceivably, the reason for enhancement in heat resistance in the case where Ca or Sr is employed as element M2 is that there is a small difference in ionic radius between Ca or Sr and element M1 (in particular Nd, Pr, or Sm), and thus the perovskite type crystal structure is stabilized.

Variations

The present invention is not limited to the aforementioned Examples and embodiments, and may be variously modified within the scope of the invention, for example, as follows.

Variation 1:

The aforementioned embodiment of the apparatus employing a thermistor element is directed to a temperature sensor for measuring the temperature of exhaust gas of an internal combustion engine. However, needless to say, the thermistor element of the present invention may be applied to any apparatus.

Variation 2:

In the embodiment above, the element electrode wire 204 is formed of a Pt—Rh alloy. However, no particular limitation is imposed on the material of the element electrode wire, and a Pt material (e.g., a mixture of Pt or a Pt—Rh alloy with Sr), a Pt—Ir alloy, and an alloy containing a noble metal other than Pt may be used as a base.

Variation 3:

When the thermistor element 202 is disposed in the metallic tube 212, the circumference of the thermistor element 202 is sealed with a glass material. Then, the thermistor element 202 and the sheath member 206 are disposed in the metallic tube 212, to thereby fabricate a temperature sensor.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application Nos. 2015-077398 filed on Apr. 6, 2015 and 2015-204134 filed on Oct. 15, 2015, the above noted applications incorporated herein by reference in their entirety.

What is claimed is:

1. A sintered electroconductive oxide having a perovskite oxide type crystal structure represented by a compositional formula: $M1_a M2_b Mn_c Al_d Cr_e O_f$ wherein M1 represents at least one element selected from group 3 elements; and M2 represents at least one element selected from the group consisting of Mg, Ca, Sr and Ba, wherein element M1 predominantly includes at least one element selected from the group consisting of Nd, Pr and Sm, and a, b, c, d, e and f satisfy the following relationships:

$0.600 \leq a < 1.000$, $0 < b \leq 0.400$, $0 \leq c < 0.150$, $0.400 \leq d < 0.950$, $0.050 < e \leq 0.600$, $0.50 < e/(c+e) \leq 1.00$, and $2.80 \leq f \leq 3.30$.

2. The sintered electroconductive oxide as claimed in claim 1, wherein c and e satisfy $0.65 \leq e/(c+e) \leq 1.00$.

3. The sintered electroconductive oxide as claimed in claim 1, wherein a, b, c d, e and f satisfy the following relationships:

$0.700 \leq a < 1.000$, $0 < b \leq 0.300$, $0 \leq c < 0.140$, $0.500 < d < 0.950$, $0.050 < e \leq 0.500$, $0.65 < e/(c+e) \leq 1.00$, and $2.80 \leq f \leq 3.30$.

4. The sintered electroconductive oxide as claimed in claim 1, wherein M1 is at least one element selected from the group consisting of Nd, Pr and Sm, and M2 is at least one element selected from the group consisting of Ca and Sr.

5. A thermistor element comprising a thermistor portion which is formed of the sintered electroconductive oxide as claimed in claim 1.

6. A temperature sensor comprising the thermistor element as claimed in claim 5.

* * * * *